L. S. LACHMAN.
ELECTRIC WELDING DEVICE.
APPLICATION FILED JULY 12, 1920.

1,416,360.

Patented May 16, 1922.

Inventor
LAURENCE S. LACHMAN
By his Attorneys

UNITED STATES PATENT OFFICE.

LAURENCE S. LACHMAN, OF NEW YORK, N. Y., ASSIGNOR TO UNIVERSAL ELECTRIC WELDING COMPANY, OF NEW YORK, N. Y., A CORPORATION OF NEW YORK.

ELECTRIC WELDING DEVICE.

1,416,360.  Specification of Letters Patent.  Patented May 16, 1922.

Application filed July 12, 1920. Serial No. 395,591.

*To all whom it may concern:*

Be it known that I, LAURENCE S. LACHMAN, a citizen of the United States, and a resident of New York, in the county of New York and State of New York, have invented certain new and useful Improvements in Electric Welding Devices, of which the following is a specification.

My present invention relates to electric metal working apparatus and particularly to the dies which hold the work and by means of which the current and welding pressure is applied thereto.

The object of the invention is to provide means whereby metal wires which are in side contact and located in a common plane may be readily welded together along the contacting sides.

A further object is to provide simple and positively acting means for supplying the electric current and the necessary welding pressure to complete the welding operation.

The invention is primarily useful for welding the wires of a wire mesh or net-work in which it is desired to have all the wires disposed in a common plane and it is as applied to this use that the invention is herein shown and will be described but it will be understood that the invention may be employed for other purposes without departing from the spirit and scope thereof as set forth in the appended claims.

The invention consists in the construction and arrangement of electric welding device or apparatus hereinafter described and then set forth in the appended claims.

In the accompanying drawings, Fig. 1 is a side elevation of a set of welding dies constructed and arranged in accordance with this invention.

Figure 1:
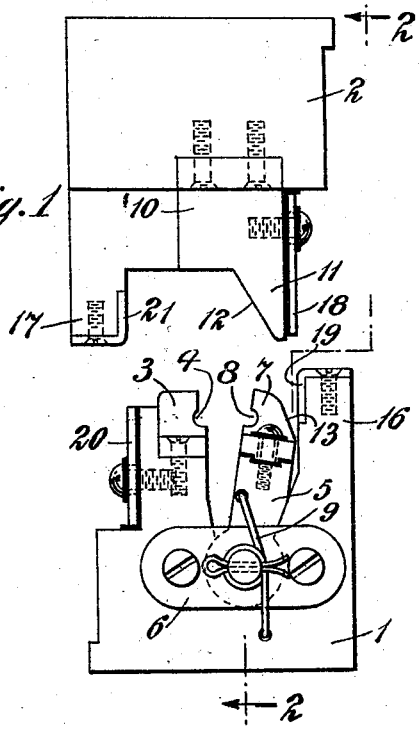
Figure 2:
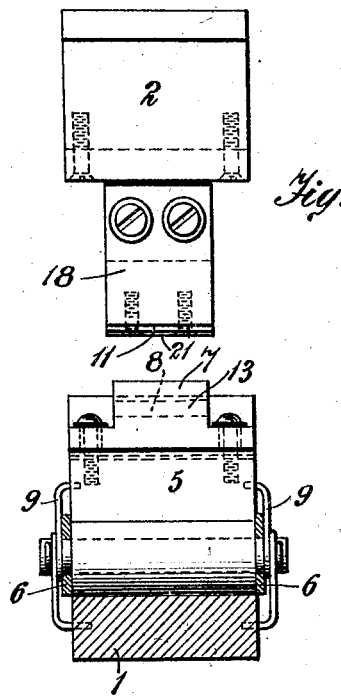
Fig. 2 is a vertical cross-section of the same taken on the irregular line 2—2 Fig. 1, parts being shown in elevation.

In the drawings the invention is illustrated as organized for a vertical type welding machine without in any manner intending to limit its use to such style machine.

1 indicates the lower platen and 2 indicates the upper platen of an electric welding machine of any suitable construction. The upper and lower platens 1 and 2 are respectively attached to the opposite ends of the secondary of an electric welding transformer forming, as is usual, part of the electric welding machine. Apparatus for welding in general by means of the electric current and pressure is now so well known and understood in the art that further description or illustration of the parts which are not part of the present invention is deemed unnecessary, it being understood that the blocks or platens 1, 2 are of copper or other good conducting material and form the terminals of the secondary circuit of the transformer.

The lower platen 1 is provided with a preferably removable contact jaw 3 of good conducting material and having a work engaging groove 4 in its vertical face. The jaw 3 is in electrical contact with the block or platen 1.

5 indicates an arm pivotally mounted in a suitably formed bearing in the block 1, the same being held from endwise movement by plates 6 secured to the block 1. The arm 5 carries a removable contact jaw 7 of good conducting material secured to its upper end, the jaw 7 being however insulated from the arm 5 and block 1. The jaw 7 is provided with an inclined surface 13 and a work engaging groove 8 and co-operates with the jaw 3 to grip the work between them. The jaw 7 is reciprocated toward the jaw 3 by mechanism to be presently described, it being normally forced in the opposite direction by springs 9 located at each end of the pivot for the arm 5 in an obvious manner.

As will be seen the formation of the work engaging faces of the contact jaws is such as to prevent displacement of the pieces of work with relation to one another transversely to the line of pressure applied by the contact jaws.

The upper platen 2 is provided with a removable block 10 of good conducting material secured to its under side. Said block is in electrical contact with the platen 2 and is provided with a depending lug or finger 11 having an inclined surface 12.

The platen 2 carrying the block 10 is reciprocable to and from the welding jaws 3, 7 by any suitable mechanism. As the platen 2 approaches the platen 1 the inclined surface of the finger 11 engages the inclined surface of the jaw 7.

Figure 3:
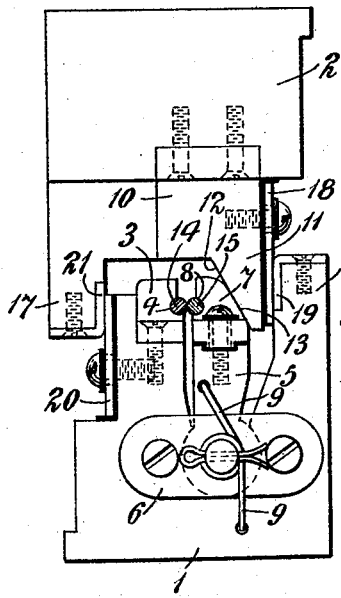
Fig. 3 is a view similar to Fig. 1 but shows the dies in operative position.
Figure 4:
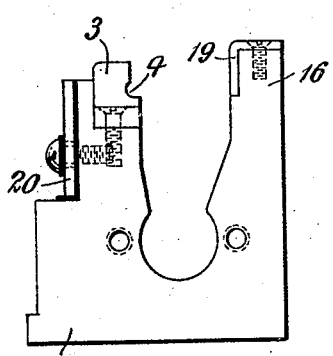
Fig. 4 is a detached view of the lower die.

In the operation of the device, the work to be welded, which in the present case is the wires 14, 15 (Fig. 3), is assembled together in the machine with the wires in side longitudinal contact or one wire may be placed in the groove 4 and the other in the groove 8 of the welding jaws 3 and 7. The upper platen 2 is brought down and the finger 11 engaging the back of the jaw 13 forces the jaw toward the companion jaw 3, thus gripping the wires 14 and 15 between the two jaws as shown in Fig. 3. At this time the electric current is turned on in the usual way and current flows from the platen 2, block 10 and finger 11 to the jaw 7, across the contacting wires, to the jaw 3 and platen 1. As the flow of current heats and softens the parts of the wires in contact, further downward movement of the platen 2, by means of the inclined surfaces 12 and 13, causes the heated section to be upset and the weld completed due to the movement of the jaw 7 and arm 5 toward the jaw 3. As soon as the weld is completed the flow of current is interrupted and the platen 2 raised. The work is then freed from the jaws by the springs 9 retracting the arm 5.

As the platen 2 approaches the platen 1, the side of the finger 11 engages and bears against the side of a ledge 16 projecting upwardly from the platen 1 and at about the same time a downwardly projecting lug 17 engages a vertical side of the platen 1 so that the jaws 3 and 7 are positively forced together against and overcome any resistance of the material of the work 14, 15. Without these positive interlocking guiding means the work might tend to spring the material of the finger 11 and cause an unsatisfactory weld.

Preferably the finger 11 is provided with a steel wear plate 18 insulated from the finger 11 and platen 2 and the ledge 16 is also provided with a steel wear plate 19. Similarly the side of the platen 1 engaged by the lug 17 is preferably provided with a steel wear plate 20 insulated therefrom and the lug 17 is provided with a wear plate 21.

What I claim as my invention is:—

1. In an electric welding apparatus, a welding die comprising a pair of jaws adapted to grip the work in side contact and prevent displacement thereof transversely to the line of applied pressure and means adapted to engage one of said jaws and apply welding pressure thereto.

2. In an electric welding apparatus, a welding die comprising a pair of jaws adapted to reciprocate toward and from each other and grip the work in side contact therebetween and reciprocable means reciprocable transversely to the line of reciprocation of the jaws and adapted to force one of said jaws toward the other and supply electric current thereto.

3. In an electric welding apparatus, a platen provided with a fixed contact jaw, a movable cooperating contact jaw mounted on said platen but insulated therefrom and means adapted to force said cooperating jaw toward the first-named jaw and supply electric current thereto.

4. In an electric welding apparatus, the combination with the platens forming the terminals of the transformer secondary, of a pair of contact jaws mounted on one of said platens and adapted to grip the work at the joint to be welded between them and means carried by the other platen and adapted to move one of said jaws toward the other.

5. In an electric welding apparatus, the combination with the platens forming the terminals of the transformer secondary, of a pair of contact jaws mounted on one of said platens and adapted to engage the work on opposite sides at the joint to be welded, one of said jaws being movable to and from the other and means carried by the other platen and adapted to engage the movable jaw and force it toward the fixed jaw to apply upsetting pressure to the work.

6. In an electric welding apparatus, the combination with the platens forming the terminals of the transformer secondary, of a fixed contact jaw on one platen, a cooperating contact jaw pivoted to said platen, said jaws being adapted to engage opposite sides of the work at the place of weld and means carried by the other platen for forcing said pivoted jaw toward the fixed jaw to apply upsetting pressure to the work.

7. In an electric welding apparatus, the combination with the platens forming the terminals of the transformer secondary, of a fixed contact jaw on one platen, a cooperating contact jaw pivoted to said platen, said jaws being adapted to engage opposite sides of the work at the place of weld and an inclined surface on the other platen adapted to force said pivoted jaw toward the fixed jaw to apply upsetting pressure to the work.

8. In an electric welding apparatus, the combination with the platens forming the terminals of the transformer secondary, of a fixed contact jaw mounted on one platen and in electric connection therewith, a cooperating contact jaw pivoted to but insulated from said platen, said jaws being adapted to engage opposite sides of the work at the place of weld and means secured to the other platen and adapted to force the pivoted jaw toward the fixed jaw to apply upsetting pressure to the work, said means also establishing electric connection between the work and the latter-named platen.

9. In an electric welding apparatus, the combination with the platens forming the terminals of the transformer secondary, of a pair of contact jaws mounted on one of said platens and adapted to engage the work on opposite sides at the joint to be welded, one of said jaws being movable to and from the other, means carried by the other platen and adapted to engage the movable jaw and force it toward the fixed jaw to apply upsetting pressure to the work and interlocking means adapted to prevent relative lateral movement of said platens during the application of the upsetting pressure.

Signed at New York in the county of New York and State of New York this 9th day of July A. D. 1920.

LAURENCE S. LACHMAN.

Witness:
    IRENE LEFKOWITZ.